US009560014B2

(12) United States Patent
Grobman et al.

(10) Patent No.: US 9,560,014 B2
(45) Date of Patent: Jan. 31, 2017

(54) SYSTEM AND METHOD FOR AN ENDPOINT HARDWARE ASSISTED NETWORK FIREWALL IN A SECURITY ENVIRONMENT

(71) Applicant: McAfee Inc., Santa Clara, CA (US)

(72) Inventors: Steve Grobman, El Dorado Hills, CA (US); Raj Samani, Stoke Poges (GB); Ofir Arkin, Petah Tikva (IL); Sven Schrecker, San Marcos, CA (US)

(73) Assignee: McAfee, Inc., Santa Clara, CA (US)

( * ) Notice: Subject to any disclaimer, the term of this patent is extended or adjusted under 35 U.S.C. 154(b) by 474 days.

(21) Appl. No.: 13/748,578

(22) Filed: Jan. 23, 2013

(65) Prior Publication Data

US 2014/0208413 A1    Jul. 24, 2014

(51) Int. Cl.
| H04L 29/06 | (2006.01) |
| G06F 9/455 | (2006.01) |
| G06F 21/55 | (2013.01) |
| G06F 21/57 | (2013.01) |

(52) U.S. Cl.
CPC ....... *H04L 63/0227* (2013.01); *G06F 9/45558* (2013.01); *G06F 21/552* (2013.01); *G06F 21/577* (2013.01); *G06F 2009/45595* (2013.01); *H04L 63/0823* (2013.01); *H04L 63/123* (2013.01)

(58) Field of Classification Search
None
See application file for complete search history.

(56) References Cited

U.S. PATENT DOCUMENTS

| 5,987,610 | A | 11/1999 | Franczek et al. |
| 6,073,142 | A | 6/2000 | Geiger et al. |
| 6,460,050 | B1 | 10/2002 | Pace et al. |
| 7,506,155 | B1 | 3/2009 | Stewart et al. |
| 8,121,146 | B2 | 2/2012 | Sood et al. |
| 8,477,610 | B2 * | 7/2013 | Zuo .......... H04L 47/20 370/230 |
| 8,661,246 | B1 * | 2/2014 | Hoech et al. ......... 713/156 |
| 2005/0005165 | A1 | 1/2005 | Morgan et al. |
| 2005/0262086 | A1 | 11/2005 | Ta et al. |

(Continued)

FOREIGN PATENT DOCUMENTS

WO    WO 2011-144488 A2    11/2011

OTHER PUBLICATIONS

International Search Report and Written Opinion in International Application No. PCT/US2014/012642, mailed May 7, 2014, 12 pages.

(Continued)

*Primary Examiner* — Jeffery Williams
(74) *Attorney, Agent, or Firm* — Patent Capital Group

(57) ABSTRACT

A method is provided in one example embodiment and includes receiving a traffic flow at a tamper resistant environment from an application, where the tamper resistant environment is separated from a host operating system. The method also includes applying a security token to the traffic flow and sending the traffic flow to a server. In specific embodiments, a security module may add information about the application to traffic flow. A trapping module may monitor for a memory condition and identify the memory condition. The trapping module may also, responsive to identifying the memory condition, initiate a virtual environment for the application, and check the integrity of the traffic flow.

20 Claims, 5 Drawing Sheets

(56) References Cited

U.S. PATENT DOCUMENTS

| | | |
|---|---|---|
| 2007/0209060 A1 | 9/2007 | Rhodes |
| 2007/0271610 A1 | 11/2007 | Grobman |
| 2009/0125902 A1 | 5/2009 | Ghosh et al. |
| 2009/0323128 A1 | 12/2009 | Asuri et al. |
| 2010/0138674 A1 | 6/2010 | Dimitrakos et al. |
| 2011/0107423 A1 | 5/2011 | Kolar Sunder et al. |
| 2011/0145592 A1 | 6/2011 | Greiner |
| 2011/0154023 A1 | 6/2011 | Smith et al. |
| 2011/0182179 A1* | 7/2011 | Alesi ................... H04L 47/10 370/230 |
| 2011/0314546 A1 | 12/2011 | Aziz et al. |
| 2011/0321148 A1* | 12/2011 | Gluck ............................ 726/9 |
| 2012/0255017 A1 | 10/2012 | Sallam |

OTHER PUBLICATIONS

Supplementary European Search Report in EP Application No. 14 74 3962, mailed on Jun. 6, 2016, 7 pages.

Notice of Preliminary Rejection in KR Application No. 2015-7016622, mailed on Jun. 21, 2016, with English translation, 11 pages.

* cited by examiner

SYSTEM AND METHOD FOR AN ENDPOINT HARDWARE ASSISTED NETWORK FIREWALL IN A SECURITY ENVIRONMENT

TECHNICAL FIELD

This disclosure relates in general to the field of network security, and more particularly, to using a tamper resistant environment to manage traffic flow.

BACKGROUND

The field of network security has become increasingly important in today's society. The Internet has enabled interconnection of different computer networks all over the world. However, the Internet has also presented many opportunities for malicious operators to exploit these networks. In some instances, once malicious software (also referred to herein as 'malware') has infected a host computer, a malicious operator may issue commands from a remote computer to control the malicious software. In other scenarios, the software may be inherently configured to perform certain actions without necessarily responding to an operator's commands. Malicious software can be configured to perform any number of malicious actions, such as sending out spam or malicious emails from the host computer, stealing sensitive information from a business or individual associated with the host computer, propagating to other host computers, and/or assisting with distributed denial of service attacks. In other scenarios, malicious software can be configured to target certain regions of a storage disk in order to gain unauthorized control of the host computer and its resources. Thus, the ability to effectively protect and maintain stable computers and systems continues to present significant challenges for component manufacturers, system designers, and network operators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving a traffic flow at a tamper resistant environment from an application, where the tamper resistant environment is separated from a host operating system. The method also includes applying a security token to the traffic flow and sending the traffic flow to a server.

In specific embodiments, a security module may add information about the application to traffic flow. A trapping module may monitor a memory of the host for a memory condition, identify the condition, and responsive to identifying the condition, initiate a virtual environment for the application; and check the integrity of the traffic flow.

Example Embodiments

Figure 1:
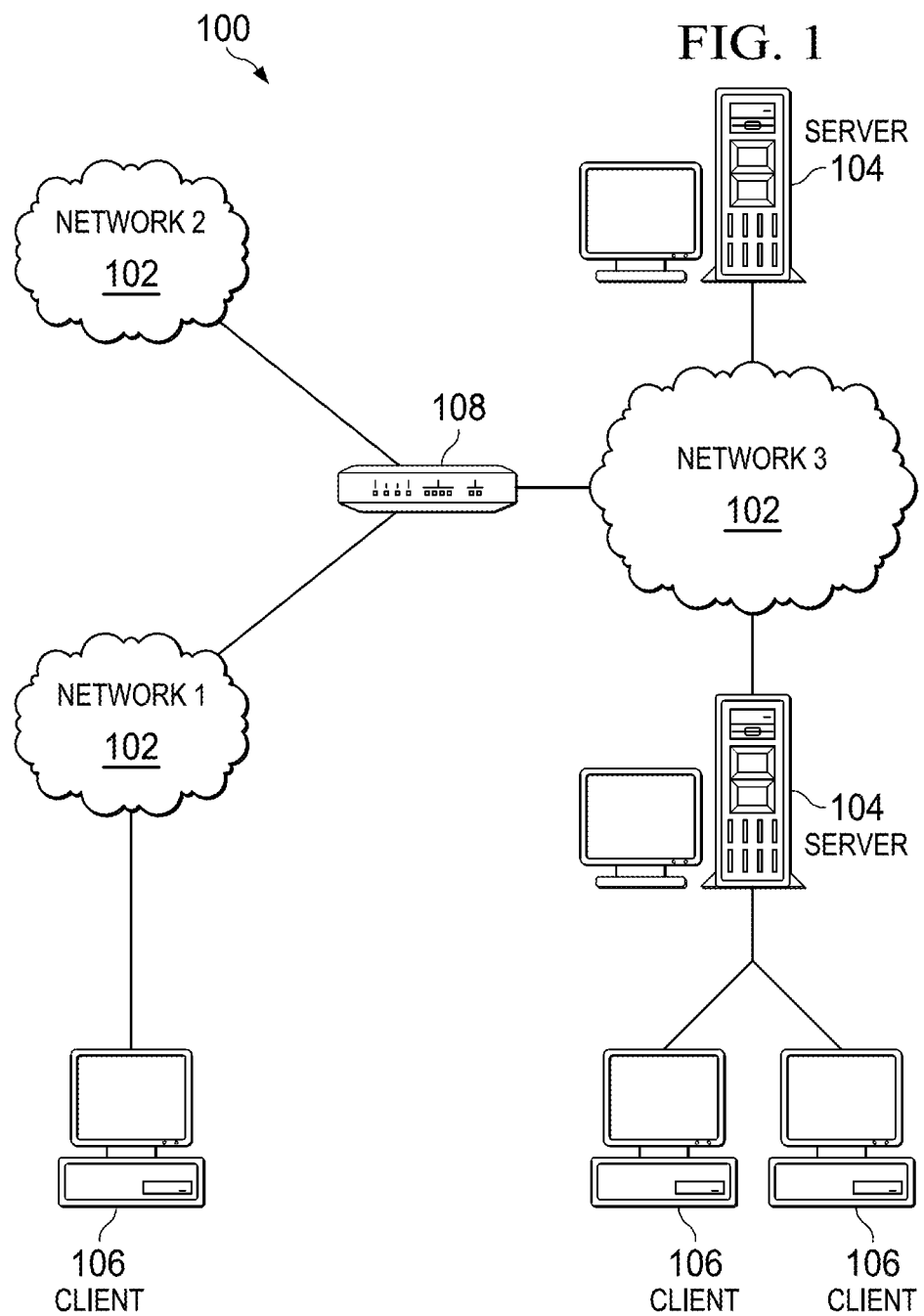
FIG. 1 is a simplified illustration of a network architecture in accordance with an embodiment.

FIG. 1 illustrates a network architecture 100, in accordance with one embodiment. As shown, a plurality of networks 102 is provided, in the context of network architecture 100. Networks 102 may each take any form including, but not limited to a local area network (LAN), a wireless network, a wide area network (WAN) such as the Internet, peer-to-peer network, etc.

Coupled to networks 102 are servers 104 which are capable of communicating over networks 102. Also coupled to networks 102 and servers 104 is a plurality of clients 106. Such servers 104 and/or clients 106 may each include a desktop computer, lap-top computer, hand-held computer, mobile phone, tablet, personal digital assistant (PDA), peripheral (e.g. printer, etc.), any component of a computer, and/or any type of logic (or code) capable of facilitating the endpoint hardware assisted network firewall activities as described herein. In order to facilitate communication among networks 102, at least one gateway 108 is optionally coupled therebetween.

Elements of FIG. 1 may be coupled to one another through one or more interfaces employing any suitable connection (wired or wireless), which provide viable pathways for electronic communications, such as traffic flow (or network flow, network traffic, data packets, etc.). Additionally, any one or more of these elements of FIG. 1 may be combined or removed from the architecture based on particular configuration needs.

Generally, network architecture 100 may be implemented in any suitable type or topology of network (e.g., Intranet, Extranet, LAN, WAN, WLAN, MAN, VLAN, VPN, cellular network, etc.) or suitable combinations thereof, including wired and/or wireless communication. In network architecture 100, traffic flow, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in network architecture 100. Suitable interfaces and infrastructure may be provided to enable communication between the cellular network and the packet data networks.

A packet is a unit of data that can be routed between an origin and a destination on a packet-switched network. A packet includes a source network address and a destination network address. These network addresses can be Internet Protocol (IP) addresses in a TCP/IP messaging protocol. The term 'data' as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

One or more embodiments of this disclosure recognize and take into account that firewall capabilities that comprehend an application and a user that initiated a traffic flow are an existing capability. However, there is an inherent weakness if the operating system (OS) of a host device is compromised. In this scenario, it is possible to falsify the out-of-band metadata that is associated with the traffic flow, or to inject malicious code into a legitimate application in order to use the application to pass a firewall policy and exfiltrate data or issue a network based attack.

One or more embodiments of this disclosure describe a series of techniques that enable the underlying hardware of the client (also referred to as the host or endpoint) to assert integrity into the communication, by ensuring that applications (and their associated communication stream) assert the hash or image of the application along with process owner information and other metadata to the firewall directly from the hardware. In addition, a device identifier can be asserted through a tamper resistant environment by preventing modifications in order to assure that the communication is originating from a known entity and ensuring that impersonation from another device is not possible. Having the tamper resistant environment (or supervisory software such as a VMM) provides the integrity check and out-of-band communication of network data ensures that only approved applications executed on specific devices by certain users may be honored by the firewall. The applications and devices may be defined by a security policy.

Figure 2:
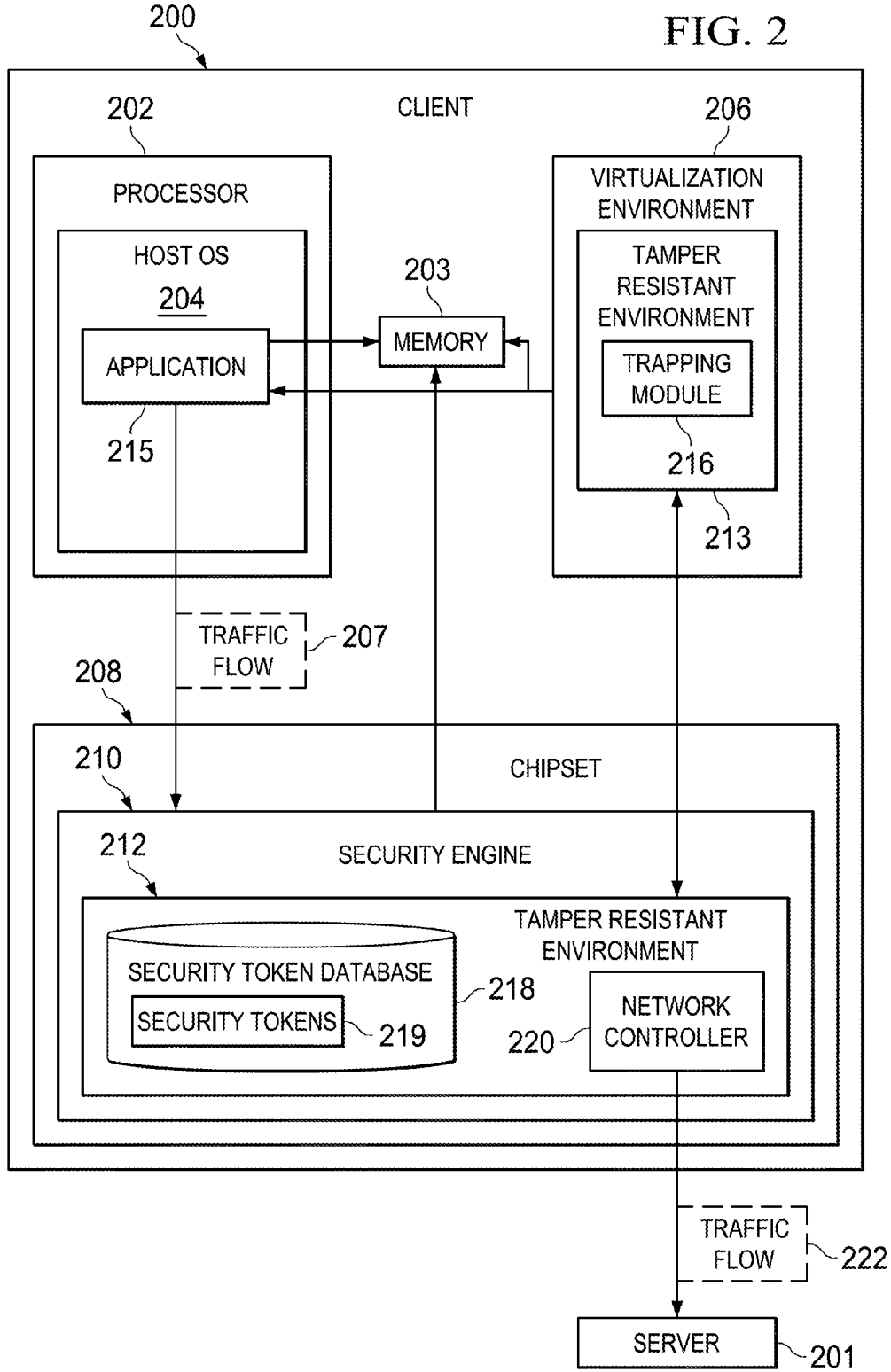
FIG. 2 is a simplified diagram of a client and server according to an illustrative embodiment.

Turning to FIG. 2, FIG. 2 is a simplified diagram of a client 200 and server 201 according to an illustrative embodiment. Client 200 may be any type of computing device having at least one processor 202 and at least one memory 203. In an embodiment, the client 200 comprises a desktop computer, lap-top computer, or a handheld and/or mobile computing device, such as a cellular phone, smart phone, tablet, personal device assistant (PDA), netbook, or the like. Client 200 may also include a virtualization environment 206 and a chipset 208 with a security engine 210.

Embodiments of this disclosure may use security engine (SE) 210 to provide secure execution and storage environments such as tamper resistant environment 212 for deterrence of unauthorized usage of restricted software. In an embodiment, security engine 210 may be implemented as functionality within a manageability engine (ME) hardware component (not shown) within chipset 208. Security engine 210 may be an embedded microcontroller running an independent firmware stack. In other embodiments, security engine 210 may be implemented as circuitry within chipset 208 apart from a ME. Security engine 210 may comprise firmware that runs on the microcontroller in tamper resistant environment 212 and provide a secure storage area which is protected from tampering by user level programs, the operating system, or the basic input/output system (BIOS) running on a processor within client 200. In an embodiment, the secure storage may store security tokens 219 used to generate cryptographic keys in a security token database 218. Security token database 218 may comprise any type of memory.

Traffic flow 207 may be moved through security engine 210 for the purposes of applying and adding metadata about application 215 to traffic flow 207 to create traffic flow 222. The metadata may be information about application 215, such as a hash/image of application 215 along with process owner information. Depending on particular implementations, other information associated with the application may also be included in the metadata. By having tamper resistant environment 212 assert what application that traffic flow 222 is associated with allows the infrastructure (for example, a firewall at a server) to determine whether it is appropriate to allow, log or block traffic flow 222. Security engine 210 may provide this information in an out-of-band communication using network controller 220. By having security engine 210 apply security tokens 219, a firewall on server 201 may honor traffic flow 222 as the integrity of traffic flow 222 has been ensured by security engine 210.

Additionally, in an embodiment, trapping module 216 may ensure integrity of traffic flow 207 before traffic flow 207 is delivered to security engine 210. Virtualization environment 206 may include tamper resistant environment 213. Running within tamper resistant environment 213 is trapping module 216. Trapping module 216 may be configured to monitor memory 203 for memory conditions. For example, if a certain memory location is accessed, trapping module 216 may request control of memory 203 from processor 202. Trapping module 216 may be configured to obtain information about application 215 by accessing memory 203, and send that information to security engine 210.

In another embodiment, security engine 210 may scan memory 203 directly and obtain information about application 215. Tamper resistant environment 212 may need to comprehend virtual memory and paging complexities in parallel host OS 204.

In operational terminology, and in particular one embodiment, trapping module 216 may choose to only perform the integrity check a small (but random) percentage of the time. This may enable integrity with minimal overhead and would be unpredictable to an attacker who would be unable to correlate re-installation of an uncompromised image with the random integrity checks.

One or more embodiments of this disclosure recognize and take into account that virtualization traps in current technology fire whenever a specific scenario arises such as a guest accessing a specific memory location or execution of a specific instruction. In an embodiment of this disclosure, trapping module 216 may specify what percentage of the time the trap should fire when the condition is met. Internally, the CPU core may create a random number and fire with an associated rate that is specified when the trap is configured. This embodiment enables improved performance over current technology as a VMM exit may not occur except when a required trap is needed to satisfy the trap firing distribution.

Figure 3:
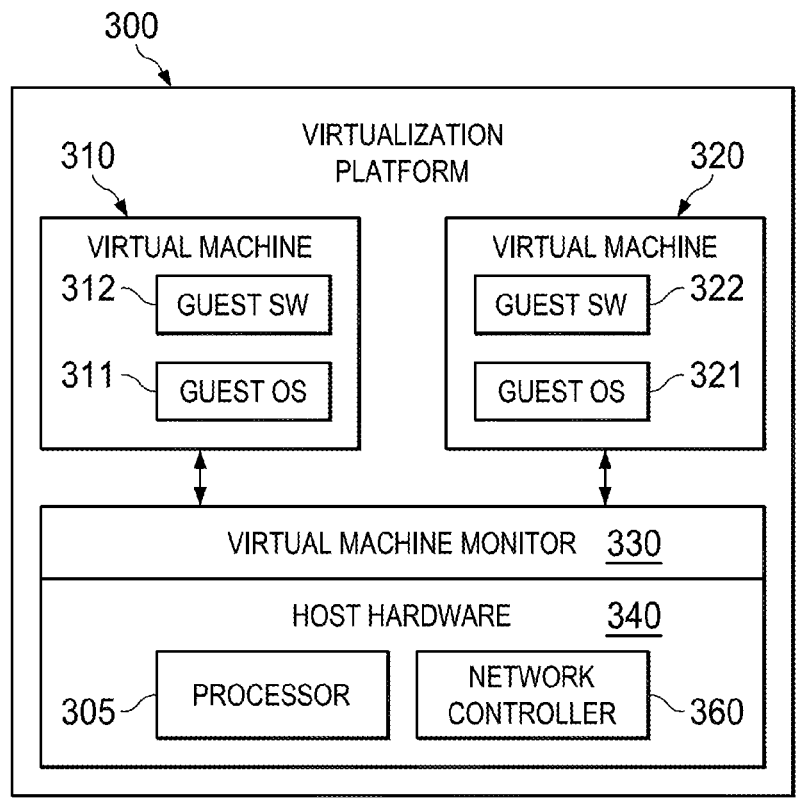
FIG. 3 is a simplified virtual machine environment for implementing a secure partition for managing actions such as protecting devices using encryption, user identity authentication, and password protection schemes in accordance with one embodiment.

FIG. 3 shows a virtual machine environment for implementing a secure partition for managing actions such as protecting devices using encryption, user identity authentication, and password protection schemes in accordance with one embodiment. If platform 300 is virtualized, it may include only a single processor, but a virtual machine monitor ("VMM 330") on the host may present multiple abstractions and/or views of the host, such that the underlying hardware of the host appears as one or more independently operating virtual machines ("VMs"). VMM 330 may be implemented in software (e.g., as a standalone program and/or a component of a host operating system), hardware, firmware and/or any combination thereof. VMM 330 manages allocation of resources on the host and performs context switching as necessary to cycle between various VMs according to a round-robin or other predetermined scheme. It will be readily apparent to those of ordinary skill in the art that although only one processor is illustrated ("Processor 305"), embodiments of the present invention are not so limited and multiple processors may also be utilized within a virtualized environment.

Although only two VM partitions are illustrated ("VM 310" and "VM 320", hereafter referred to collectively as "VMs"), these VMs are merely illustrative and additional virtual machines may be added to the host. VM 310 and VM 320 may function as self-contained platforms respectively, running their own "guest operating systems" (i.e., operating systems hosted by VMM 330, illustrated as "Guest OS 311" and "Guest OS 321" and hereafter referred to collectively as "Guest OS") and other software (illustrated as "Guest Software 312" and "Guest Software 322" and hereafter referred to collectively as "Guest Software").

Each Guest OS and/or Guest Software operates as if it were running on a dedicated computer rather than a virtual machine. That is, each Guest OS and/or Guest Software may expect to control various events and have access to hardware resources on platform 300 such as, for example, memory (not shown). Within each VM, the Guest OS and/or Guest Software may behave as if they were, in effect, running on physical hardware ("Host Hardware 340", which may include a network controller 360) of platform 300.

It will be readily apparent to those of ordinary skill in the art that a physical hardware partition with a dedicated processor such as chipset 208 may provide a high level of security. It will also be readily apparent to those of ordinary skill in the art that tamper resistant environment 213 may be implemented within a virtualized environment. For example, VM 320 may be dedicated as tamper resistant environment 213 on a host while VM 310 runs typical applications on the host. In this scenario, the host may or may not include multiple processors. If the host does include two processors, for example, VM 320 may be assigned the other processor while VM 310 (and other VMs on the host) may share the resources of processor 305. On the other hand, if the host includes only a single processor, the processor may serve both the VMs, but VM 320 may still be isolated from the other VMs on the host with the cooperation of VMM 330. For the purposes of simplicity, embodiments of this disclosure are described in a security engine (or manageability engine) environment, but may not be limited to these embodiments. Instead, any reference to security engine, manageability engine (ME), a "partition", "a secure partition", a "security partition" and/or a "management partition" shall include any physical and/or virtual partition (as described above).

Upon trapping module 216 identifying a memory condition designated by the system, user, manufacturer, or some other entity, VMM 330 assigns application 215 to a VM 310 or 320. To perform auditing within tamper resistant environment 213 in a virtualized environment such as that described in FIG. 3, VMM 330 manages an audit mask profile for each of VMs 310 and 320. When a device is assigned to either VM 310 or 320, the respective audit mask profile for the VM is associated with tamper resistant environment 213. Each time the VM audit mask profile associated with tamper resistant environment 213 changes, VMM 330 generates an audit event record. In this way, the VM that initiates an auditable event is represented in the audit event records. For example, if VM 310 issues storage I/O commands, then VM 310 is identified in the audit event records.

Figure 4:
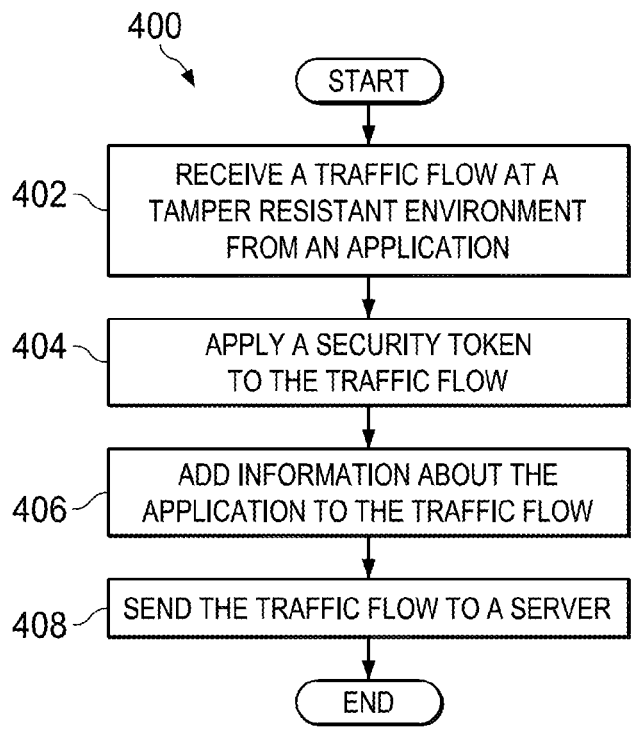
FIG. 4 is a simplified flowchart illustrating an example flow that may be associated with security engine for sending traffic flow in a network environment.

Turning to FIG. 4, a flowchart illustrates an example flow 400 that may be associated with security engine 210 for sending a traffic flow in a network environment. In an embodiment, flow 400 represents one or more activities performed by security engine 210 in client 200.

Flow 400 may begin at 402 when security engine 210 receives the traffic flow at a tamper resistant environment from an application. The traffic flow may be generated by an application within a host operating system. In one or more embodiments, the traffic flow may only be routed through security engine 210 if the application is a suspicious application. In other embodiments, any traffic flow coming from any application may be routed through security engine 210. In different embodiments, the traffic flow may be routed through security engine 210 if it is on a list or not on another list.

At 404, security engine 210 may apply a security token to the traffic flow. The security token may indicate to a receiver of the traffic flow that the traffic flow came from the indicated source. In one or more embodiments, the security token may be derived from an enhanced privacy identification to attest that the tamper resistant environment is trusted. The tamper resistant environment may attest that it is a specific type of tamper resistant environment that is trusted. An enhanced privacy identification can be a cryptographic scheme that enables a remote authentication of a hardware device while preserving the privacy of the device owner. When security engine 210 applies a security token, security engine 210 may be digitally signing the metadata using public key cryptography. A digital signature is a mathematical scheme for demonstrating the authenticity of a digital message or document. Public-key cryptography refers to a cryptographic system requiring two separate keys, one of which is secret and one of which is public. Although different, the two parts of the key pair are mathematically linked. One key locks or encrypts the plaintext, and the other unlocks or decrypts the ciphertext. Neither key can perform both functions by itself. The public key may be published without compromising security, while the private key must not be revealed to anyone not authorized to read the messages.

At 406, security engine 210 may add information about the application to the traffic flow. The information may be metadata about the application. Additionally, 406 may occur at other points in flow 400. For example, 406 may occur before 404 and after 402.

At 408, security engine 210 may send the traffic flow to a server. Security engine 210 may use a network controller located within the tamper resistant environment to send the traffic flow. In another embodiment, security engine 210 may encrypt the traffic flow and send it to another network controller, which is external to the tamper resistant environment.

Figure 5:
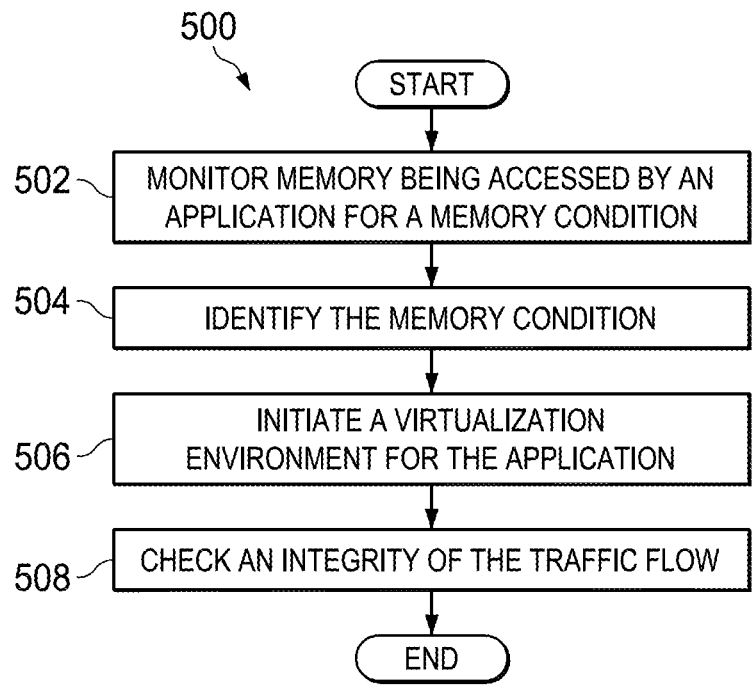
FIG. 5 is a simplified flowchart illustrating an example flow that may be associated with a trapping module for trapping application information in accordance with an embodiment.

FIG. 5 is a simplified flowchart illustrating an example flow that may be associated with a trapping module for trapping application information in accordance with an embodiment. In an embodiment, flow 500 represents one or more activities performed by trapping module 216 in client 300.

Flow 500 may begin at 502 when trapping module 216 may monitor memory being accessed by an application for a memory condition. In one or more embodiments, trapping module 216 may monitor regions the memory associated with buffers used to send/transmit data for the memory condition. The memory may be the client (host) memory.

At 504, trapping module 216 may identify the memory condition. At 506, trapping module 216 may initiate a virtualization environment for the application. When a virtualization environment is initiated, a virtualization trap may be fired. In one or more embodiments, the virtualization trap may only be fired when a condition is asserted based on a configured probabilistic configuration. The probabilistic configuration may be a policy set forth by a manufacturer, user, dynamically, randomly, or by some other method. At 508, trapping module 216 may check an integrity of the traffic flow.

In operational terminology, in an embodiment, when application 215 sends or receives traffic flow over a network connection, hardware and driver stack process events can be trapped by technologies such as virtualization technology. A configuration to trap on a network can be established and trapping module 216 in tamper resistant environment 213 can analyze application 215 sending/receiving traffic flow 207. Tamper resistant environment 213 can be within virtualization environment 206 or similar software solution or a security engine. When the trap occurs, application 215, interacting with the network, will be in context on processor 202, which makes scanning and attestation easier.

Figure 6:
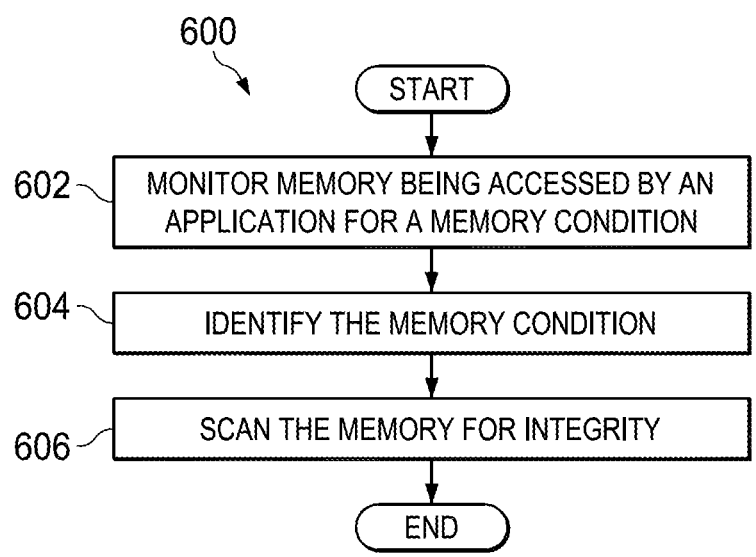
FIG. 6 is a flowchart illustrating an example flow that may be associated with security engine for obtaining application information in accordance with an embodiment.

FIG. 6 is a flowchart illustrating an example flow 600 that may be associated with security engine 210 for obtaining application information in accordance with an embodiment. In an embodiment, flow 600 represents one or more activities performed by security engine 210 in client 200.

Flow 600 may begin at 602 when security engine 210 monitors memory being accessed by an application for a memory condition. At 604, security engine 210 may identify the memory condition. At 606, security engine 210 may scan the memory for integrity.

In operational terminology, in an embodiment, security engine 210 can directly scan/view memory 203 and independently create a map and assessment of all executable instructions on a platform. In this case, tamper resistant environment 212 may need to comprehend virtual memory and paging complexities in parallel to the OS.

Figure 7:
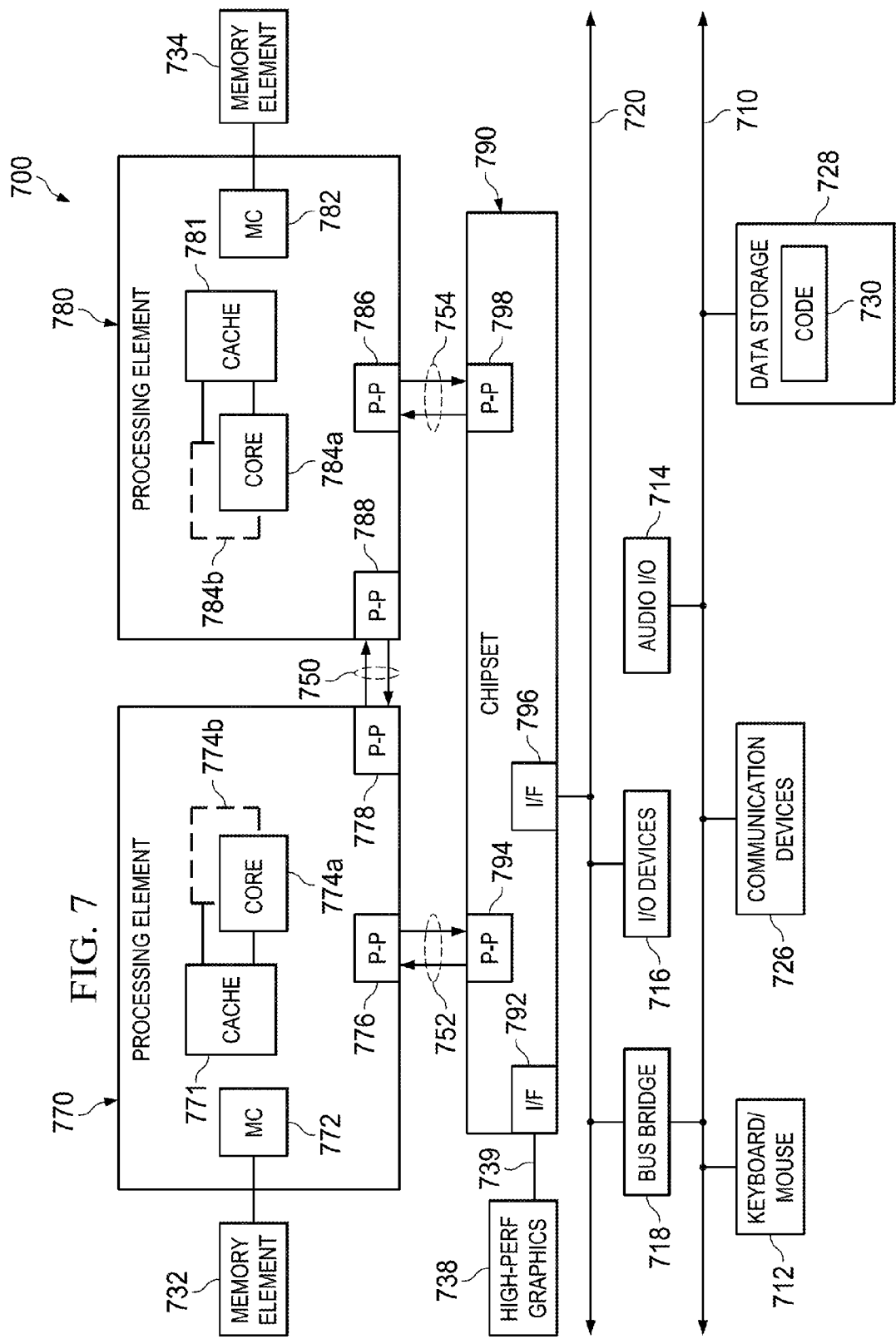
FIG. 7 is a block diagram illustrating a computing system that is arranged in a point-to-point configuration according to an embodiment.

FIG. 7 illustrates a computing system 700 that is arranged in a point-to-point (PtP) configuration according to an embodiment. In particular, FIG. 7 shows a system where processors, memory, and input/output devices are interconnected by a number of point-to-point interfaces. Generally, network elements of communication system 10 may be configured in the same or similar manner as computing system 700. For example, client 200 and server 201, as described herein, may each be a computing system, such as exemplary computing system 700.

As illustrated in FIG. 7, system 700 may include several processing elements, of which only two processing elements 770 and 780 are shown for clarity. While only two processing elements 770 and 780 are shown, it is to be understood that an embodiment of system 700 may also include only one such processing element. Processing elements 770 and 780 may each include a processor core 774a and 784a to execute multiple threads of a program. Processors 770 and 780 may also each include integrated memory controller logic (MC) 772 and 782 to communicate with memory elements 732 and 734. The memory elements 732 and/or 734 may store various data. In alternative embodiments, memory controller logic 772 and 782 may be discrete logic separate from processing elements 770 and 780.

Processing elements 770 and 780 may be any type of a processing element (also referred to herein as 'processor').

Processing elements 770 and 780 may exchange data via a point-to-point (PtP) interface 750 using point-to-point interface circuits 778 and 788, respectively. Processing elements 770 and 780 may each exchange data with a chipset 790 via individual point-to-point interfaces 722 and 724 using point-to-point interface circuits 776, 786, 794, and 798. Chipset 790 may also exchange data with a high-performance graphics circuit 738 via a high-performance graphics interface 739, using an interface circuit 792, which could be a PtP interface circuit. In alternative embodiments, any or all of the PtP links illustrated in FIG. 7 could be implemented as a multi-drop bus rather than a PtP link.

As shown in FIG. 7, each of processing elements 770 and 780 may be multicore processors, including first and second processor cores (i.e., processor cores 774a and 774b and processor cores 784a and 784b). Such cores may be configured to execute instruction code in a manner similar to that discussed above with reference to FIGS. 1-6. Each processing element 770, 780 may include at least one shared cache 796. Shared cache 771, 781 may store data (e.g., instructions) that are utilized by one or more components of processing elements 770, 780, such as cores 774a, 774b, 784a, and 784b.

Chipset 790 may be in communication with a bus 720 via an interface circuit 796. Bus 716 may have one or more devices that communicate over it, such as a bus bridge 718 and I/O devices 716. Via a bus 710, bus bridge 718 may be in communication with other devices such as a keyboard/mouse 712 (or other input device such as a touch screen, trackball, etc.), communication devices 726 (such as modems, network interface devices, or other types of communication devices that may communicate through a computer network), audio I/O devices 714, and/or a data storage device 728. Data storage device 728 may store code 730 that may be executed by processing elements 770 and/or 780. In alternative embodiments, any portions of the bus architectures could be implemented with one or more PtP links.

In one example implementation, network elements of communication system 10 may include software in order to achieve the tamper resistant environments outlined herein. These activities can be facilitated by various modules (e.g., trapping module 216, and/or security engine 210, etc.), which can be suitably combined in any appropriate manner, and which may be based on particular configuration and/or provisioning needs. In other embodiments, these tamper resistant environments may be executed externally to these elements, or included in some other network element to achieve this intended functionality. In still other embodiments, the elements in client 200 may include this software (or reciprocating software) that can coordinate with other network elements in order to achieve the operations, as outlined herein. Furthermore, the modules can be implemented as software, hardware, firmware, or any suitable combination thereof.

Note that in certain example implementations, the tamper resistant environments outlined herein may be implemented by logic encoded in one or more tangible, non-transitory media (e.g., embedded logic provided in an application specific integrated circuit (ASIC), digital signal processor (DSP) instructions, software (potentially inclusive of object code and source code) to be executed by a processor (e.g., processing elements 770, 780), or other similar machine, etc.). In some of these instances, one or more memory elements (as shown in FIG. 7) can store data used for the operations described herein. This includes the memory element being able to store software, logic, code, or processor instructions that are executed to carry out the activities described in this Specification.

A processor (as shown in FIG. 7) can execute any type of instructions associated with the data to achieve the operations detailed herein in this Specification. In one example, a processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof. Any of the potential processing elements, modules, and machines described in this Specification should be construed as being encompassed within the broad term 'processor.'

The network elements in client 200 may further keep information, to be used in achieving the correlating activities as discussed herein, in any suitable memory element (random access memory (RAM), read only memory (ROM), EPROM, EEPROM, ASIC, etc.), software, hardware, or in any other suitable component, device, element, or object where appropriate and based on particular needs. Moreover, the information being used, tracked, sent, or received in client 200 could be provided in any database, register, queue, table, cache, or other storage structure, all of which can be provided in any suitable timeframe. Any of the memory items or storage options may be included within the broad term 'memory element' as used herein.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that client 200 and its teachings are readily scalable and can accommodate a large number of components, as well as more complicated/sophisticated arrangements and configurations. Accordingly, the examples provided should not limit the scope or inhibit the broad teachings of client 200 as potentially applied to a myriad of other architectures.

It is also important to note that the steps in the preceding flow diagrams illustrate only some of the possible tamper resistant environments that may be executed by, or within, client 200. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by client 200 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. For example, network controller 220 may be separate from chipset 208. Data storage elements may also be combined. Additionally, although client 200 has been illustrated with reference to particular elements and operations that facilitate the communication process, these elements and operations may be replaced by any suitable architecture, protocols, and/or processes that achieve the intended functionality of client 200.

While the present invention has been described with respect to a limited number of embodiments, those skilled in the art will appreciate numerous modifications and variations therefrom. It is intended that the appended claims cover all such modifications and variations as fall within the true spirit and scope of this present invention.

The following examples pertain to embodiments in accordance with this Specification. One or more embodiments may provide a method including: receiving a traffic flow at a tamper resistant environment from an application, wherein the tamper resistant environment is separated from an operating system of a host; applying a security token to the traffic flow; and sending the traffic flow to a server.

In an example of one embodiment, the security token is derived from an enhanced privacy identification to attest that the tamper resistant environment is trusted.

In an example of one embodiment, the security token is derived by the tamper resistant environment, wherein the traffic flow includes metadata and wherein applying the security token to the traffic flow comprises digitally signing the metadata using public key cryptography.

In an example of one embodiment, the method further comprises adding information about the application to traffic flow.

In an example of one embodiment, the method further comprises monitoring a memory of the host for a memory condition; identifying the memory condition; responsive to identifying the memory condition, initiating a virtual environment for the application; and checking the integrity of the traffic flow.

In an example of one embodiment, the method further comprises monitoring a memory of the host for a memory condition; identifying the memory condition; and responsive to identifying the memory condition, scanning the memory for integrity.

In an example of one embodiment, monitoring for the memory condition comprises monitoring regions of the memory associated with buffers used to send data for the memory condition.

In an example of one embodiment, initiating the virtual environment for the application comprises initiating the virtual environment for the application randomly in response to identifying the condition.

In an example of one embodiment, initiating the virtual environment for the application comprises firing a virtualization trap only when a condition is asserted based on a configured probabilistic configuration.

In an example of one embodiment, checking the integrity of the traffic flow comprises checking the integrity of the traffic flow randomly.

One or more embodiments may provide at least one non-transitory computer-readable medium that includes code for execution and when executed by a processor is operable to perform operations comprising: receiving a traffic flow at a tamper resistant environment from an application, wherein the tamper resistant environment is separated from an operating system of a host; applying a security token to the traffic flow; and sending the traffic flow to a server.

In an example of one embodiment, the security token is derived from an enhanced privacy identification to attest that the tamper resistant environment is trusted.

In an example of one embodiment, the security token is derived by the tamper resistant environment, wherein the traffic flow includes metadata and wherein the code applying the security token to the traffic flow comprises code for digitally signing the metadata using public key cryptography.

In an example of one embodiment, the processor is operable to perform further operations comprising adding information about the application to traffic flow.

In an example of one embodiment, the processor is operable to perform further operations comprising monitoring a memory of the host for a memory condition; identifying the memory condition; responsive to identifying the memory condition, initiating a virtual environment for the application; and checking the integrity of the traffic flow.

In an example of one embodiment, the processor is operable to perform further operations comprising monitoring a memory of the host for a memory condition; identifying the memory condition; responsive to identifying the memory condition, scanning the memory for integrity.

In an example of one embodiment, the code for monitoring for the memory condition comprises code for monitoring regions the memory associated with buffers used to send data for the memory condition.

One or more embodiments may provide an apparatus, comprising a memory element configured to store data; a processor operable to execute instructions associated with the data; and a security engine configured to interface with the memory element and the processor to: receive a traffic flow at a tamper resistant environment from an application, wherein the tamper resistant environment is separated from an operating system of a host; apply a security token to the traffic flow; and send the traffic flow to a server.

In an example of one embodiment, the apparatus further comprises a trapping module configured to: monitor a memory of the host for a memory condition; identify the memory condition; responsive to identifying the memory condition, initiate a virtual environment for the application; and checking the integrity of the traffic flow.

In an example of one embodiment, the security engine is further configured to monitor a memory of the host for a memory condition; identify the memory condition; and responsive to identifying the memory condition, scan the memory for integrity.

In an example of one embodiment, the security token is derived from an enhanced privacy identification to attest that the tamper resistant environment is trusted.

In an example of one embodiment, the security token is derived by the tamper resistant environment, wherein the traffic flow includes metadata and wherein applying the security token to the traffic flow comprises digitally signing the metadata using public key cryptography.

In an example of one embodiment, the method, medium, and/or apparatus further comprises adding information about the application to traffic flow.

In an example of one embodiment, the method, medium, and/or apparatus further comprises monitoring a memory of the host for a memory condition; identifying the memory condition; responsive to identifying the memory condition, initiating a virtual environment for the application; and checking the integrity of the traffic flow.

In an example of one embodiment, the method, medium, and/or apparatus further comprises monitoring a memory of the host for a memory condition; identifying the memory condition; and responsive to identifying the memory condition, scanning the memory for integrity.

In an example of one embodiment, monitoring for the memory condition comprises monitoring regions of the memory associated with buffers used to send data for the memory condition.

In an example of one embodiment, initiating the virtual environment for the application comprises initiating the virtual environment for the application randomly in response to identifying the condition.

In an example of one embodiment, initiating the virtual environment for the application comprises firing a virtualization trap only when a condition is asserted based on a configured probabilistic configuration.

In an example of one embodiment, checking the integrity of the traffic flow comprises checking the integrity of the traffic flow randomly.

What is claimed is:

1. A method comprising:
receiving, at a tamper resistant environment on a host from a virtualization environment of the host, information associated with an application executing on the host;
receiving a traffic flow at the tamper resistant environment from the application, wherein the tamper resistant environment is separated from an operating system of the host;
creating a modified traffic flow by applying a security token to the received traffic flow and by adding the information to the received traffic flow; and
sending the modified traffic flow to a server.

2. The method of claim 1, where the security token is derived from an enhanced privacy identification to attest that the tamper resistant environment is trusted.

3. The method of claim 1, wherein the security token is derived by the tamper resistant environment, wherein the information added to the received traffic flow includes metadata and wherein applying the security token to the received traffic flow comprises:
digitally signing the metadata using public key cryptography.

4. The method of claim 1, further comprising:
monitoring a memory of the host for a memory condition;
identifying the memory condition;
assigning the application to a virtual machine in the virtualization environment based, at least in part, on identifying the memory condition;
trapping, in the virtualization environment, process events associated with the traffic flow; and
checking the integrity of the traffic flow before the traffic flow is delivered to the tamper resistant environment.

5. The method of claim 1, further comprising:
monitoring a memory of the host for a memory condition;
identifying the memory condition; and
scanning the memory for integrity based, at least in part, on identifying the memory condition.

6. The method of claim 4, wherein monitoring for the memory condition comprises:
monitoring regions of the memory associated with buffers used to send data for the memory condition.

7. The method of claim 4, wherein initiating the virtual environment for the application comprises:

assigning the application to the virtual machine randomly based, at least in part, on identifying the memory condition.

8. The method of claim 4, wherein the checking the integrity of the traffic flow before the traffic flow is delivered to the tamper resistant environment comprises:
checking the integrity of the traffic flow randomly.

9. At least one non-transitory computer-readable medium that includes code for execution and when executed by a processor is operable to perform operations comprising:
receiving, at a tamper resistant environment on a host from a virtualization environment on the host, information associated with an application executing on the host;
receiving a traffic flow at the tamper resistant environment from the application, wherein the tamper resistant environment is separated from an operating system of the host;
creating a modified traffic flow by applying a security token to the received traffic flow and by adding the information to the received traffic flow; and
sending the modified traffic flow to a server.

10. The computer-readable medium of claim 9, wherein the security token is derived from an enhanced privacy identification to attest that the tamper resistant environment is trusted.

11. The computer-readable medium of claim 9, wherein the security token is derived by the tamper resistant environment, wherein the information added to the received traffic flow includes metadata and wherein the code applying the security token to the received traffic flow comprises code for:
digitally signing the metadata using public key cryptography.

12. The computer-readable medium of claim 9, wherein the code, when executed by the processor, is operable to perform further operations comprising:
monitoring a memory of the host for a memory condition;
identifying the memory condition;
assigning the application to a virtual machine in the virtualization environment based, at least in part, on identifying the memory condition;
trapping, in the virtualization environment, process events associated with the traffic flow; and
checking the integrity of the traffic flow before the traffic flow is delivered to the tamper resistant environment.

13. The computer-readable medium of claim 9, wherein the code, when executed by the processor, is operable to perform further operations comprising:
monitoring a memory of the host for a memory condition;
identifying the memory condition; and
scanning the memory for integrity based, at least in part, on identifying the memory condition.

14. The computer-readable medium of claim 12, wherein the code for monitoring for the memory condition, when executed by the processor, is operable to perform further operations comprising:
monitoring regions of the memory associated with buffers used to send data for the memory condition.

15. An apparatus, comprising:
a memory element configured to store data;
a processor operable to execute instructions associated with the data; and
a security engine configured to interface with the memory element and the processor to:
receive, from a virtualization environment of a host, information associated with an application executing on the host;
receive a traffic flow at the tamper resistant environment from the application, wherein the tamper resistant environment is separated from an operating system of the host;
create a modified traffic flow by applying a security token to the received traffic flow and by adding the information to the received traffic flow; and
send the modified traffic flow to a server.

16. The apparatus of claim 15, further comprising:
a trapping module configured to:
monitor a memory of the host for a memory condition;
identify the memory condition;
assign the application to a virtual machine in the virtualization environment based, at least in part, on identifying the memory condition;
trap, in the virtual environment, process events associated with the traffic flow; and
check the integrity of the traffic flow before the traffic flow is delivered to the tamper resistant environment.

17. The apparatus of claim 15, wherein the security engine is further configured to:
monitor a memory of the host for a memory condition;
identify the memory condition; and
scan the memory for integrity based, at least in part, on identifying the memory condition.

18. The computer-readable medium of claim 12, wherein the code, when executed by the processor, is operable to perform further operations comprising:
initiating the virtual environment for the application by assigning the application to the virtual machine randomly based, at least in part, on identifying the memory condition.

19. The computer-readable medium of claim 12, wherein the code, when executed by the processor, is operable to perform further operations comprising:
firing a virtualization trap only when a condition is asserted based on a configured probabilistic configuration.

20. The computer-readable medium of claim 12, wherein the checking the integrity of the traffic flow before the traffic flow is delivered to the tamper resistant environment comprises:
checking the integrity of the traffic flow randomly.

* * * * *